US012755633B2

(12) United States Patent
Konzer et al.

(10) Patent No.: US 12,755,633 B2
(45) Date of Patent: Oct. 6, 2026

(54) PROVIDING ADVANCED WARNING OF UPCOMING CHANGES IN ROAD CONDITIONS AND GEOGRAPHIC DATA TO A VEHICLE DRIVER

(71) Applicant: Robert Bosch GmbH, Stuttgart (DE)

(72) Inventors: Cason Konzer, Holly, MI (US); Mark Pillote, Ann Arbor, MI (US); Rosalin Irwan, Ann Arbor, MI (US); Sivakumar Asoka Kumaran, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 18/784,422

(22) Filed: Jul. 25, 2024

(65) Prior Publication Data

US 2026/0030984 A1 Jan. 29, 2026

(51) Int. Cl.
*G08G 1/0967* (2006.01)
*B60W 40/06* (2012.01)
(Continued)

(52) U.S. Cl.
CPC ......... *G08G 1/09675* (2013.01); *B60W 40/06* (2013.01); *B60W 50/14* (2013.01);
(Continued)

(58) Field of Classification Search
CPC . G08G 1/0967; G08G 1/09675; B60W 40/06; B60W 50/14; B60W 2050/146; G06F 16/2455; G06F 16/29; H04W 4/029
(Continued)

(56) References Cited

U.S. PATENT DOCUMENTS 8,615,354 B2 * 12/2013 Barker ................. G08G 1/0104 701/119
11,073,398 B2 7/2021 Robeson et al.
(Continued)

FOREIGN PATENT DOCUMENTS

CN 113743466 A 12/2021
CN 113869140 A 12/2021
(Continued)

OTHER PUBLICATIONS

ONX, "ONX Offroad," User Guide © 2019 (17 pages).
Garmin, "RV 895 / RV 1095, Camper 895 / Camper 1095," Owner's Manual, © 2023 (68 pages).

*Primary Examiner* — Andrew Joseph Rudy
(74) *Attorney, Agent, or Firm* — Michael Best & Friedrich LLP

(57) ABSTRACT

A system for providing advanced warning of upcoming changes in road conditions and geographic data to a vehicle driver includes a sensor for sensing current road condition and upcoming road condition, and an electronic processor. The electronic processor is configured to determine a vehicle location, receive an upcoming road condition from the sensor, online databases, or a combination thereof, wherein the upcoming road condition is associated with a predetermined distance ahead of a vehicle, compare upcoming road condition to the current road condition, determine whether there are any upcoming changes in the upcoming road condition based on the compare, and selectively reporting upcoming changes in road condition.

16 Claims, 5 Drawing Sheets

(51) Int. Cl.

| | |
|---|---|
| ***B60W 50/14*** | (2020.01) |
| ***G06F 16/2455*** | (2019.01) |
| ***G06F 16/29*** | (2019.01) |
| ***H04W 4/029*** | (2018.01) |

(52) U.S. Cl.
CPC .......... *G06F 16/2455* (2019.01); *G06F 16/29* (2019.01); *H04W 4/029* (2018.02); *B60W 2050/146* (2013.01)

(58) Field of Classification Search
USPC .......................................................... 701/516
See application file for complete search history.

(56) References Cited

U.S. PATENT DOCUMENTS

| | | | | |
|---|---|---|---|---|
| 12,116,003 | B2 * | 10/2024 | Gray | G06V 40/20 |
| 12,546,616 | B2 * | 2/2026 | Quint | G01C 21/3469 |
| 2015/0088413 | A1 | 3/2015 | Becker | |
| 2020/0408559 | A1 | 12/2020 | Iida et al. | |
| 2021/0123752 | A1 | 4/2021 | Rolf et al. | |
| 2023/0004874 | A1 | 1/2023 | Rosenfeld et al. | |
| 2023/0137304 | A1 | 5/2023 | Lei et al. | |
| 2024/0034290 | A1 * | 2/2024 | Subramanian | B60T 8/17636 |
| 2024/0367665 | A1 * | 11/2024 | Kotambail | B60W 50/082 |

FOREIGN PATENT DOCUMENTS

| | | | |
|---|---|---|---|
| CN | 114140903 | A | 3/2022 |
| FR | 2785434 | A1 | 5/2000 |

* cited by examiner

PROVIDING ADVANCED WARNING OF UPCOMING CHANGES IN ROAD CONDITIONS AND GEOGRAPHIC DATA TO A VEHICLE DRIVER

BACKGROUND

Location based map features (for example, a digital map application that provides a driver or occupant with information regarding the vehicle's location and nearby points of interest) are available in modern vehicles. Drivers are able to input destination information and receive detailed map information on a head unit, a digital gauge cluster, or both. Similar mapping information is also available from a smart phone linked to the vehicle, for example, via a wireless connection such as a Bluetooth connection. While map features systems are available, there are still limitations to these systems.

SUMMARY

One example implementation provides a system for providing advanced warning of upcoming changes in road conditions and geographic data to a vehicle driver. The system includes a sensor for sensing current road condition and upcoming road condition, and an electronic processor. The electronic processor is configured to determine a vehicle location, receive an upcoming road condition from the sensor, online databases, or a combination thereof, wherein the upcoming road condition is associated with a predetermined distance ahead of a vehicle, compare upcoming road condition to the current road condition, determine whether there are any upcoming changes in the upcoming road condition based on the compare, and selectively reporting upcoming changes in road condition.

The electronic processor is further configured to transmit updates in road condition to a remote database.

The electronic processor is further configured to determine whether any upcoming road hazards are in the upcoming road condition.

The electronic processor is configured to selectively display a warning associated with any upcoming road hazards.

The sensor further senses current geographic data and upcoming geographic data and the electronic processor is further configured to receive upcoming geographic data from the plurality of sensors, online databases, or a combination thereof, wherein the upcoming geographic data is associated with the predetermined distance ahead of the vehicle location.

The electronic processor is further configured to compare the upcoming geographic data to the current geographic data.

The electronic processor is further configured to determine whether any upcoming geographic hazards are in the upcoming road condition.

The electronic processor is further configured to selectively display a warning associated with any upcoming geographic hazards.

Another example implementation provides a system for providing advanced warning of upcoming changes in road condition and geographic data to a vehicle driver. The system includes electronic processor that is configured to determine a vehicle location, search for databases associated with a predetermined location ahead of the vehicle location, selectively query available databases for updates in local upcoming road condition and local upcoming geographic data at a predetermined location ahead of the vehicle location, when updated data is received, updating a local memory within a vehicle with the updated data, and transmitting the updated data to a centralized database.

The electronic processor is further configured to receive upcoming road condition and receive upcoming geographic data.

The electronic processor is further configured to compare upcoming road condition to current road condition, determine whether any upcoming changes are in the upcoming road condition, compare upcoming geographic data to current geographic data, and determine whether any upcoming changes are in the upcoming geographic data.

The electronic processor is further configured to selectively report upcoming changes in road condition, and selectively report upcoming changes in geographic data.

The electronic processor is further configured to selectively display a warning associated with any upcoming road hazards, and selectively display a warning associated with any upcoming geographic hazards.

Still another example provides a method of providing advanced warning of upcoming changes in road condition and geographic data to a vehicle driver. The method includes determining a vehicle location, monitoring upcoming road condition at a predetermined distance ahead of the vehicle location, comparing the upcoming road condition to current road condition, determining whether any upcoming changes are present in the upcoming road condition, and selectively reporting upcoming changes in road condition.

The method further includes determining whether any upcoming road hazards are included in the upcoming road condition.

The method further includes selectively displaying a warning associated with any upcoming road hazards.

The method further includes monitoring upcoming geographic data at the predetermined distance ahead of the vehicle location.

The method further includes comparing upcoming geographic data to current geographic data.

The method further includes determining whether any upcoming geographic hazards are included in the upcoming road condition, and selectively displaying a warning associated with any upcoming geographic hazards.

The method further includes determining whether any road requirements are included in the upcoming road condition, wherein the road requirements include road width, tire chains, and snow tires, and selectively displaying a warning associated with any road requirements.

DETAILED DESCRIPTION

Figure 1:
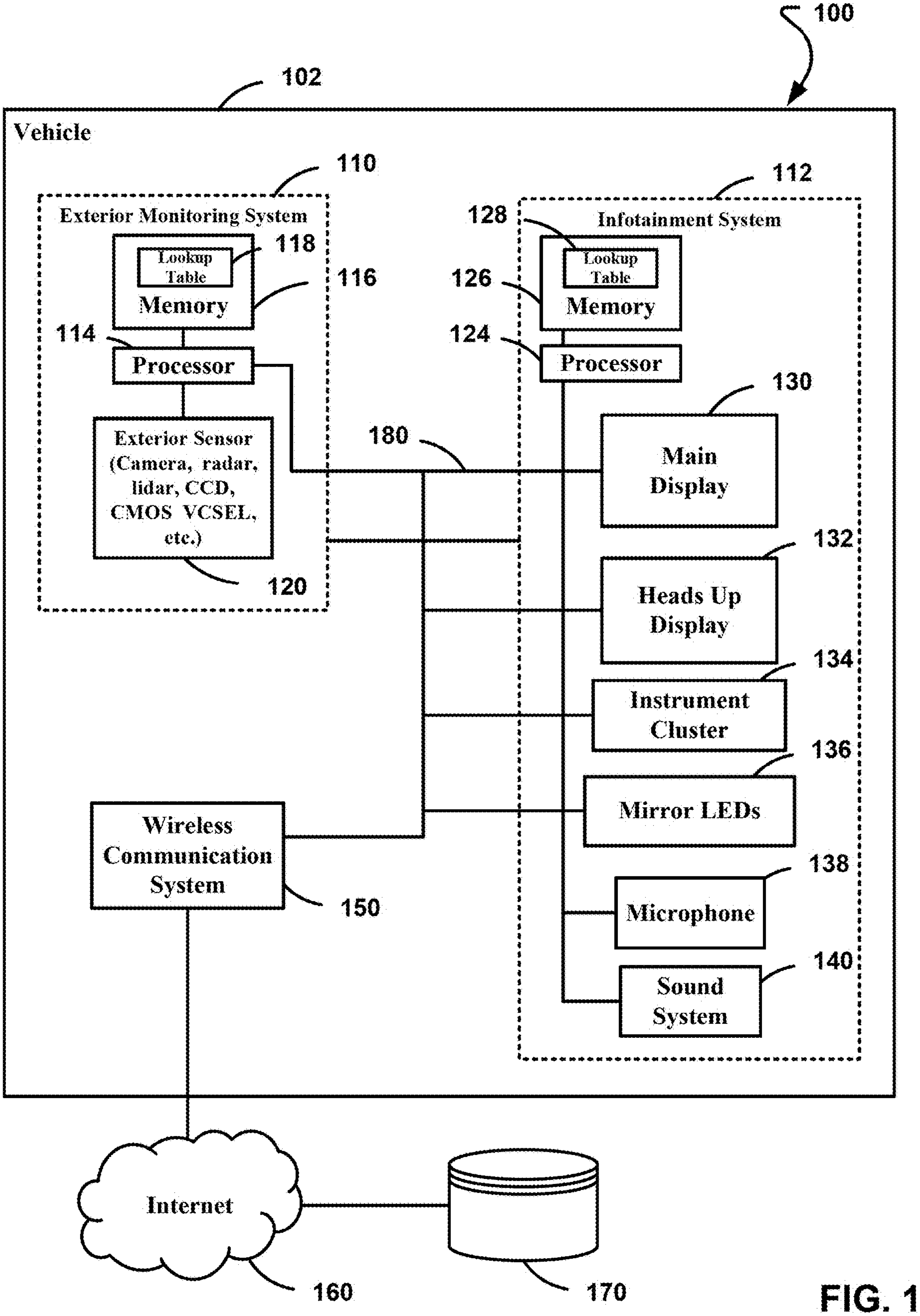
FIG. 1 is a schematic diagram of a decentralized vehicle monitoring and infotainment system.

Before any aspects, features, or instances are explained in detail, it is to be understood that the aspects, features, or instances are not limited in their application to the details of construction and the arrangement of components set forth in the following description or illustrated in the following drawings. Other instances are possible and are capable of being practiced or of being carried out in various ways.

It should also be noted that a plurality of hardware and software-based devices, as well as a plurality of different structural components may be utilized in various implementations. Aspects, features, and instances may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more processors. As a consequence, it should be noted that a plurality of hardware and software-based devices, as well as a plurality of different structural components may be utilized to implement the invention. For example, "control units" and "controllers" described in the specification can include one or more electronic processors, one or more memories including a non-transitory computer-readable medium, one or more input/output interfaces, and various connections (for example, a system bus) connecting the components.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

It should also be understood that although certain drawings illustrate hardware and software located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable connections or links.

Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations collectively. To reiterate, those electronic processors and processing may be distributed.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

For ease of description, some or all the example systems presented herein are illustrated with a single exemplar of each of its component parts. Some examples may not describe or illustrate all components of the systems. Other instances may include more or fewer of each of the illustrated components, may combine some components, or may include additional or alternative components.

FIG. 1 illustrates an example system 100 for controlling vehicle operation based on driver attentiveness. The system 100 shown is a decentralized system in which each subsystem includes a dedicated processor. In the example shown, the system 100 resides in a vehicle 102 and includes an exterior monitoring system 110 and an infotainment system 112. The exterior monitoring system 110 includes an electronic processor 114 connected to a memory 116. In one example, the memory 116 includes a database 118 that stores information related to mapping and guidance, e.g., a current road condition or conditions, speed, road closures, map information, etc. In one example, the data in the database 118 is temporary and is updated based on path planning or changes in vehicle location. In some instances, other data structures to store and access data are used in place of or in addition to a database. As further shown, the exterior monitoring system 110 also includes an exterior sensor 120 connected to the electronic processor 114. In some instances, more than one exterior sensor is used. In some instances, the exterior sensor 120 includes or takes the form of a front windshield camera, a time-of-flight (ToF) sensor, a radar sensor, a lidar sensor, an ultrasonic sensor, or a combination thereof. Further, the exterior sensor 120 can include a charge-coupled device (CCD), a complementary metal-oxide-sensor (CMOS), and/or a vertical-cavity surface-emitting laser (VCSEL).

The exterior sensor 120 is used, among other things, to monitor the road and a road condition or road conditions around the vehicle. For example, the exterior sensor 120 can capture images of signs that the vehicle is approaching and software and hardware in the exterior sensor 120 or other components of the exterior monitoring system 110 or system 100 analyze the images and present the sign information to the driver of the vehicle. The exterior sensor 120 also monitors the road condition or conditions at a predetermined distance ahead of the vehicle. For example, in the case of lidar, the exterior sensor has field of view or a range. In some cases, the range is about one-thousand three-hundred feet ahead of the vehicle 102. Thus, the exterior sensor 120 senses a road condition or conditions within the field of view or range of the sensor. Of course, road conditions are encountered over time. Thus, road conditions immediately experienced by the vehicle (and, more specifically, the vehicle tires, wheels, and suspension) at its current location are referred to as current road conditions. Road conditions that the vehicle will experience (for example, at a location the vehicle will be at in the future based on the vehicle speed and direction and which have been sensed by an exterior sensor at a distance ahead of the current location of the vehicle) are referred to as upcoming road conditions. As the road conditions change, the system 100 alerts the driver of the vehicle 102. In some instances, the system 100 obtains information related to the geography surrounding this vehicle. This information is referred to as geographic data and includes information regarding the geography, roads, and land over which the vehicle travels. This information may include, for example, road maps, altitude, road inclines, road metadata (for example, public road, private road, toll road), parking information (for example, locations of parking lots and spaces and requirements for parking passes), requirements related to recreation passes, camping permits, and other information regarding points of interest). In some instances, geographic data is obtained from an external database (for example, the database 170 described below). The database 170 also receives vehicle position, vehicle heading, and current road conditions from the system 100 of the vehicle 102. Alternatively, or in addition, the exterior sensor 120 senses geographic data and as the geographic data changes, the system 100 provides alerts to the driver of the vehicle 102. Depending on the range of the exterior sensor 120, signs related to geographic data (e.g., private property designations and private property boundaries, required permits, etc.) can be detected head of the vehicle 102 using the exterior sensor 120 and information is transmitted to an electronic processor 114, 124 that uses object detection to "read" the sign to capture the information from the sign.

In the example shown in FIG. 1, the infotainment system 112 includes an electronic processor 124 connected to a local memory 126. The local memory 126 includes a database 128 (or other access and storage data structure) that stores information related to road conditions and geographic data. As changes in the road condition and geographic data are detected, the system 100 alerts the driver of vehicle 102 prior to the vehicle 102 reaching the new road condition or geographic condition. For example, the driver is alerted to the upcoming changes by presenting the upcoming changes to the user via the infotainment system 112. If there are pending hazards in the upcoming road condition or geographic data, the system 100 provides advanced warnings to the driver via the infotainment system 112.

The infotainment system 112 is, for example, a computerized system that combines the functions of information and entertainment in the vehicle 102. In one example, the infotainment system 112 includes a touchscreen display and a range of features such as music playback, navigation, voice recognition, and smartphone integration. In one example, the infotainment system 112 provides a range of entertainment options for drivers and passengers, including music, videos, social media, and games. In some instances, the infotainment system 112 provides real-time information about the vehicle's operation, such as fuel efficiency, engine performance, and tire pressure. This information allows drivers to monitor the health of their vehicles and make informed decisions about vehicle operation. The infotainment system 112 may also include advanced safety features such as rearview cameras, collision warning systems, and lane departure warnings to improve safety.

In the example shown, the infotainment system 112 includes a head unit 130 coupled to the electronic processor 124. In some instances, the head unit 130 is the operational center of the infotainment system 112 and includes the main, or primary, display for presenting information to the driver and/or the passengers of the vehicle 102. The head unit 130 can also include a touch screen or physical buttons and knobs that the driver and/or occupants of the vehicle can use to provide inputs to the vehicle 102, such as, inputs related to heating/cooling, map destination inputs, radio inputs, telephone call inputs, text message inputs, etc. The head unit 130 can also be connected to a back-up camera or other camera and can display images of areas and objects within the field of view of the camera to the driver.

In one example, the infotainment system 112 includes a heads-up display 132 that projects relevant vehicle information, e.g., speed, onto the vehicle windshield within or near the driver's line of sight in the direction of travel during vehicle operation. The infotainment system 112 also includes an instrument cluster 134. In one example, the instrument cluster 134 is a digital instrument cluster that includes or displays virtual versions of, for example, a speedometer, a tachometer, an odometer, a clock, an engine temperature gauge, a fuel gauge, a range indicator, various vehicle warning indicators, or a combination these elements. In one example, the infotainment system 112 also includes a plurality of mirror lights, for example mirror light emitting diodes (LEDs) 136. The mirror LEDs 136, for example, can include a left side view mirror LED, a right-side view mirror LED, a rear-view mirror LED, or a combination thereof. In some instances, the mirror LEDs 136 are LEDs that are embedded in a respective mirror and light up to indicate a warning or provide other information to the driver.

In the example shown, the infotainment system 112 includes a microphone 138 through which voice commands are input to the infotainment system 112 and a sound system 140 through which music, directions, warnings, and other audible indicators are provided to the driver. FIG. 1 also shows that the system 100 includes a wireless communication system 150 that allows the vehicle 102 to communicate wirelessly to other vehicles. The wireless communication system 150 also allows the vehicle 102 to communicate with the Internet 160 and information available therein. A database 170 for storing information such as road conditions and geographic data is connected to the Internet 160. For example, the database 170 is a centralized database that is available online. The database 170 receives periodic updates from the system 100 of the vehicle 102. These updates include local road conditions and local geographic data gathered by the vehicle 102.

The various components of the system 100, along with other various modules and components are electrically and communicatively connected to each other via direct connections or by or through one or more control or data buses (for example, the bus 180), which enable communication therebetween. In some instances, the bus 180 is a Controller Area Network (CAN™) bus. In some instances, the bus 180 is an automotive Ethernet™, a FlexRay™ communications bus, or another suitable bus. In alternative instances, some or all the components of the system 100 may be communicatively connected using suitable wireless modalities (for example, Bluetooth™ or near field communication connections).

Figure 2:
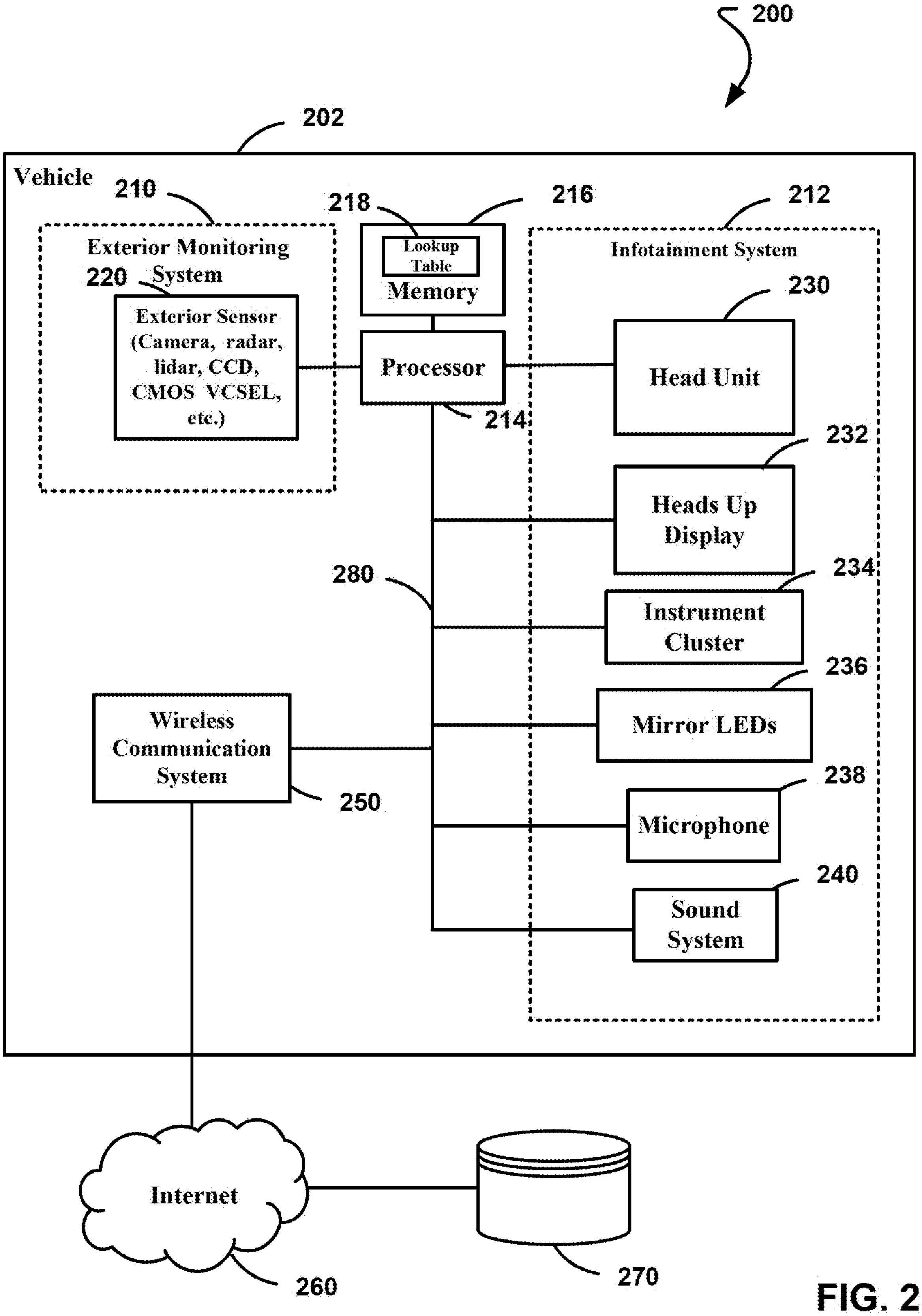
FIG. 2 is a schematic diagram of a centralized vehicle monitoring and infotainment system.

FIG. 2 illustrates a system 200 that utilizes a single centralized processor. As shown, the system 200 resides in a vehicle 202 and includes an exterior monitoring system 210 and an infotainment system 212 connected to an electronic processor 214. A memory 216 is connected to the electronic processor 214 and the memory 216 includes a database 218. In this instance, the database 218 stores data associated with the exterior monitoring system 210 and the infotainment system 212. For example, the database 218 stores information related to road conditions and geographic data. As upcoming changes in this data are detected, the system 200 alerts the driver of vehicle 202 prior to the vehicle 202 reaching the new road condition or geographic condition.

In the example shown, the exterior monitoring system 210 includes an exterior sensor 220 connected to the electronic processor 214. The exterior sensor 220 is substantially the same as the exterior sensor 120, described above, and operates in a similar manner to monitor the road conditions and geographic condition around an in the vicinity of the vehicle 202.

The infotainment system 212 includes a head unit 230 connected to the electronic processor 214. In some instances, the head unit 230 is the operational center of the infotainment system 212 and includes the main, or primary, display for presenting information to the driver and/or the passengers of the vehicle 202. The head unit 230 can also include a touch screen or physical buttons and knobs that the driver and/or occupants of the vehicle can use to provide inputs to the vehicle 202, such as, inputs related to heating/cooling, map destination inputs, radio inputs, telephone call inputs, text message inputs, etc. The head unit 230 can also be connected to a back-up camera and can display images of areas and objects within the field of view of the back-up camera to the driver.

In one example, the infotainment system 212 includes a heads-up display 232, connected to the electronic processor 214, that projects relevant vehicle information, e.g., speed, onto the vehicle windshield within or near the driver's line of sight in the direction of travel during vehicle operation. The infotainment system 212 also includes an instrument cluster 234 connected to the electronic processor 214. In one example, the instrument cluster 234 is a digital instrument cluster that includes or displays virtual versions of, for example, a speedometer, a tachometer, an odometer, a clock, an engine temperature gauge, a fuel gauge, a range indicator, various vehicle warning indicators, or any combination thereof. The infotainment system 212 also includes a plurality of mirror lights, for example light emitting diodes (LEDs) 236, connected to the electronic processor 214. The mirror LEDs 236, for example, can include a left side view mirror LED, a right-side view mirror LED, a rear-view mirror LED, or a combination thereof. In some instances, the mirror LEDs 236 are LEDS that are embedded in a respective mirror and light up to indicate a warning or provide other information to the driver.

In the example shown, the infotainment system 212 also includes a microphone 238 connected to the electronic processor 214 through which voice commands are input to the infotainment system 212 and a sound system 240 through which music, directions, warnings, and other audible indicators are provided to the driver. FIG. 2 also shows that the system 200 includes a wireless communication system 250, connected to the electronic processor 214, that allows the vehicle 202 and the driver of the vehicle 202 to communicate wirelessly to other vehicles, devices, and objects, for example, smart phones and smart buildings. The wireless communication system 250 also allows the vehicle 202 to communicate with the Internet 260. A database 270 for storing map information such as road condition and geographic data is connected to the Internet 260. Thus, in this example, the database 270 is remote. The database 270 receives periodic updates from the system 200 of the vehicle 202. These updates include local road conditions and local geographic data gathered by the vehicle 202.

The various components of the system 200, along with other various modules and components may be electrically and communicatively connected to each other in a manner that is similar to the manner in which the components of system 100 are connected to one another.

Figure 3:
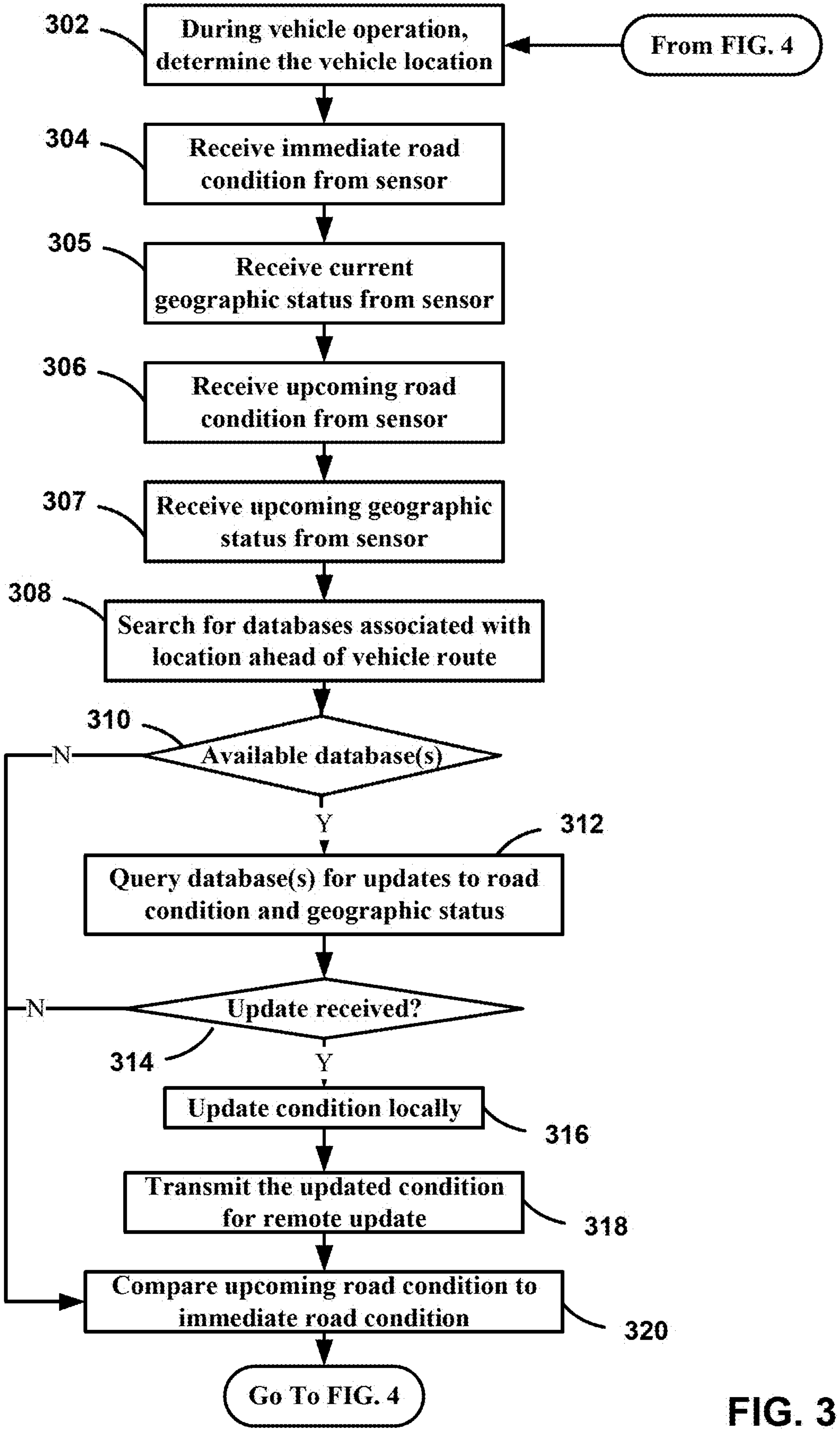
FIG. 3 and FIG. 4 illustrate a flowchart of an example method of providing advanced warning of upcoming changes in road conditions and geographic data to a vehicle driver.

FIG. 3 illustrates an example method 300 of providing advanced warning of upcoming changes in road conditions and geographic data to a vehicle driver. The steps of the method 300 may be executed by the system 100 depicted in FIG. 1 or the system 200 depicted in FIG. 2. In the case of system 100, the steps of the method 300 may be executed by the electronic processor 114 of the exterior monitoring system 110, the electronic processor 124 of the infotainment system 112, or a combination thereof. On the other hand, in the case of system 200, the steps of the method 300 may be executed by the electronic processor 214.

Beginning at step 302, during vehicle operation, the method 300 includes periodically determining the vehicle location. In this example, the vehicle location is determined using the vehicle global position system (GPS) and onboard mapping functionality. An inertial measurement unit disposed on the vehicle 102 also provides a heading and a direction for the vehicle. At step 304, the method 300 includes receiving a current road conditions from a sensor. At step 305, the method 300 includes receiving geographic data from the sensor. Then, at step 306, the method 300 includes receiving an upcoming road condition ahead of the current or immediate vehicle location. At step 307, the method 300 includes receiving an upcoming geographic data from the sensor. The current and upcoming road conditions and geographic data are monitored using the exterior sensor 120, 220 and the current and upcoming road conditions and geographic data is received and analyzed by the electronic processors 114, 124, 214. For example, road signs related to speed limits, road hazards, height limits, weight limits, private roads, required permits, etc., are detected using the exterior sensor 120, 220. This information is transmitted to an electronic processor 114, 124, 214 that can use object detection to "read" the sign to capture the information from the sign. For example, an image of a particular sign is compared to a library of known sign images to determine the meaning or content of the sign. Road conditions and/or geographic data ahead of the vehicle are sensed using the exterior sensor 120, 220. Vehicle lidar, for example, has a range of up to one-thousand three-hundred feet (1300 ft) and can sense road conditions and geographic data in the immediate vicinity of the vehicle 102 and ahead of the vehicle.

Additionally, the current and upcoming road condition and the current and upcoming geographic data in the vicinity of the vehicle and ahead of the vehicle location are monitored by monitoring the map data stored within the database 118, 218 onboard the vehicle. The upcoming road condition ahead of the vehicle location is monitored at a predetermined distance ahead of the vehicle. For example, the predetermined distance may be set by the system 100, 200 or the driver. Further, the predetermined distance may be greater than or equal to one mile, such as greater than equal to two miles, greater than or equal to three miles, greater than or equal to four miles, or greater than or equal to five miles. In another example, the predetermined distance may be less than or equal to twenty miles, such as less than or equal to fifteen miles, less than or equal to ten miles, less than or equal to nine miles, less than or equal to eight miles, less than or equal to seven miles, or less than or equal to six miles. It is to be understood that the predetermined distance may be within a range between and including any of the minimum and maximum values for the predetermined distance described herein.

Moving to step 306, the method 300 includes receiving and monitoring current geographic data (at the current vehicle location) and the upcoming geographic data ahead of the vehicle location. The current geographic data and upcoming geographic data are monitored using the exterior sensor 120, 220. For example, signs related to private lands, required permits, etc., are detected using the exterior sensor 120, 220. This information is transmitted to an electronic processor 114, 124, 214 that can use object detection to "read" the sign to determine information from the sign. Further, the current geographic data (at the current vehicle location) and the upcoming geographic data ahead of the vehicle location is monitored by monitoring the map data stored within the database 118, 218 onboard the vehicle. The geographic data ahead of the vehicle location is monitored at a predetermined distance ahead of the vehicle, e.g., the same predetermined distance described above. Proceeding to step 308, the method 300 includes sending detected hazards, GPS location of the vehicle, heading, and route if planned, for searching for online databases associated with a predetermined location ahead of the vehicle 102 or landmarks along the route ahead of the vehicle. The predetermined location ahead of the vehicle 102 can be at the same predetermined distance described above, or at a larger distance.

Continuing to step 312, the method 300 includes selectively querying one or more online database(s) for updated data, e.g., updated road conditions and updated geographic data. For example, this data may include local environmental conditions such as high-cross winds, ice on a road, debris on a road, protestors blocking a road, or other dynamic conditions that affect drivability. At decision step 314, the method 300 determines whether any updates are received. If so, at step 316, the method 300 includes updating the local data, e.g., the data within the memory 116, 126, 216 and/or databases 118, 128, 218 with the updated data from the databases queried at step 312. The databases may include federal, state, and local databases and may include queries related to the current vehicle location and the location of the vehicle at a predetermined distance or time from the current vehicle location. Open Street Maps (OSM), National Highway Traffic Safety Administration (NHTSA), and other private/public databases are also contemplated. For example, if the destination entered by the driver is a federal or state park, or there is a federal or state park that may be of interest along the route to the driver input destination, the system 100, 200 retrieves data from websites related to the park (if available) and updates the data stored locally at the vehicle 102, 202, e.g., within the memory 116, 126, 216. Moreover, the databases may include local weather databases, local news databases, etc., that may provide information regarding the local environmental conditions, as described above. Moving to step 318, the method 300 includes transmitting the updates in road conditions and geographic data to a database for a remote update. For example, the data is transmitted via the wireless communication system 150, 250 to a database 170, 270. This allows other vehicles in the area to access the same updated local data gathered by the vehicle 102, 202.

Figure 4:
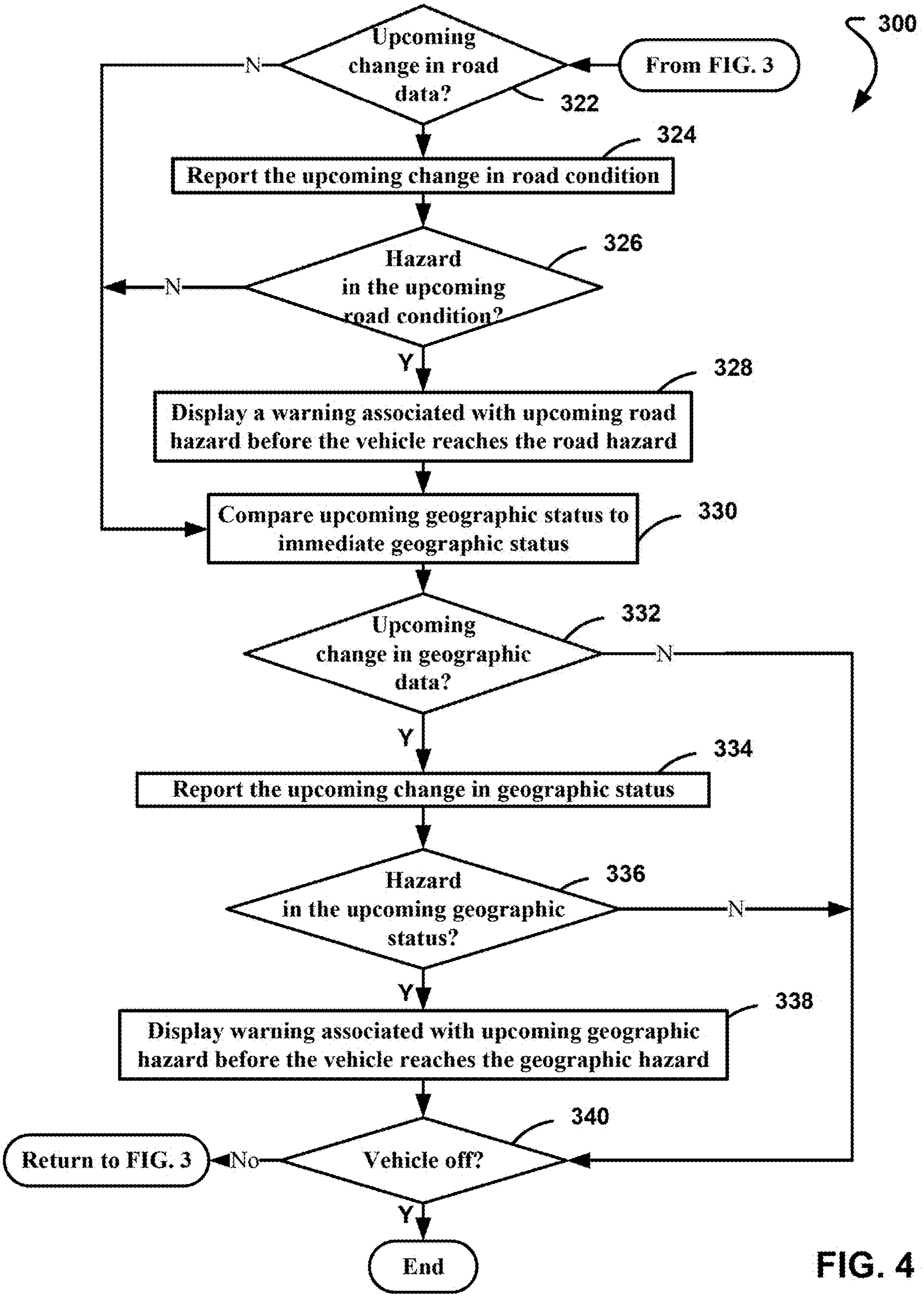

From step 318, the method 300 moves to step 320. Returning to decision step 310 if there are no available databases, the method 300 moves directly to step 320. Further, returning to decision step 314 if no updates are received, the method 300 also moves to step 320. At step 320, the method 300 includes comparing upcoming road conditions to current road conditions. From step 320, the method 300 continues to decision step 322 of FIG. 4.

At decision step 322, the method 300 includes determining whether there are any upcoming changes in the road conditions based on the comparison at step 320. If there are upcoming changes in the road conditions, the method 300 proceeds to step 324 and the method 300 includes selectively reporting the upcoming changes in the road conditions. Reporting the upcoming changes in road conditions may include updating the map displayed by the infotainment system 112, 212. Thereafter, the method 300 moves to decision step 326 and the method 300 determines whether there are any hazards included in the upcoming change in road conditions. If so, the method 300 moves to step 328 and the method 300 includes displaying a warning associated with an upcoming road hazard before the vehicle reaches the upcoming road hazard. The warning may be displayed by the infotainment system 112, 212. For example, a warning is displayed for a hazardous road condition like a low bridge or overpass height, a low weight limit for a bridge or overpass, a road closure, water on a road, deep snow on a road, ice on a road, high cross winds, debris on a road, livestock on a road, a road closure, a road or bridge missing, etc. Changes in road conditions without hazards may include changes in posted speed limits, temporary construction zones, etc.

From step 328, the method 300 proceeds to step 330. Returning to decision step 322, if there are no upcoming changes in the road conditions, the method 300 also proceeds to step 330. Moreover, at decision step 326, if there are not any hazards in the upcoming changes in the road conditions, the method 300 proceeds to step 330 as well. At step 330, the method 300 includes comparing upcoming geographic data to the current geographic data. Thereafter, at decision step 332, the method 300 includes determining whether there are any upcoming changes in geographic data based on the comparison at step 320. If there are any upcoming change in geographic data, the method 300 proceeds to step 334 and the method 300 includes reporting the upcoming changes in the geographic data. Reporting the upcoming changes in geographic data can include updating the map displayed by the infotainment system 112, 212. Then, the method 300 moves to decision step 336 and the method 300 determines whether there are any hazards included in the upcoming geographic data. If so, the method 300 moves to step 338 and the method 300 includes displaying a warning associated with any upcoming geographic hazard before the vehicle reaches the upcoming geographic hazard. For example, a warning is displayed for a hazardous geographic condition like falling rocks, fires, avalanches, volcanoes, etc. Changes in geographic data without hazards may include changes geographic data (from public to private), required permits, required passes, etc.

From step 338, the method 300 proceeds to decision step 340. Returning to decision step 332, if there are no upcoming changes in the geographic data, the method 300 also proceeds to decision step 340. Moreover, at decision step 336, if there are no hazards in the upcoming geographic data, the method 300 proceeds to decision step 340 as well. At decision step 340, the method 300 includes determining whether the vehicle is powered off. If so, he method 300 ends. If the vehicle remains on and operational, the method 300 returns to step 302 of FIG. 3 and continues as described herein.

Figure 5:
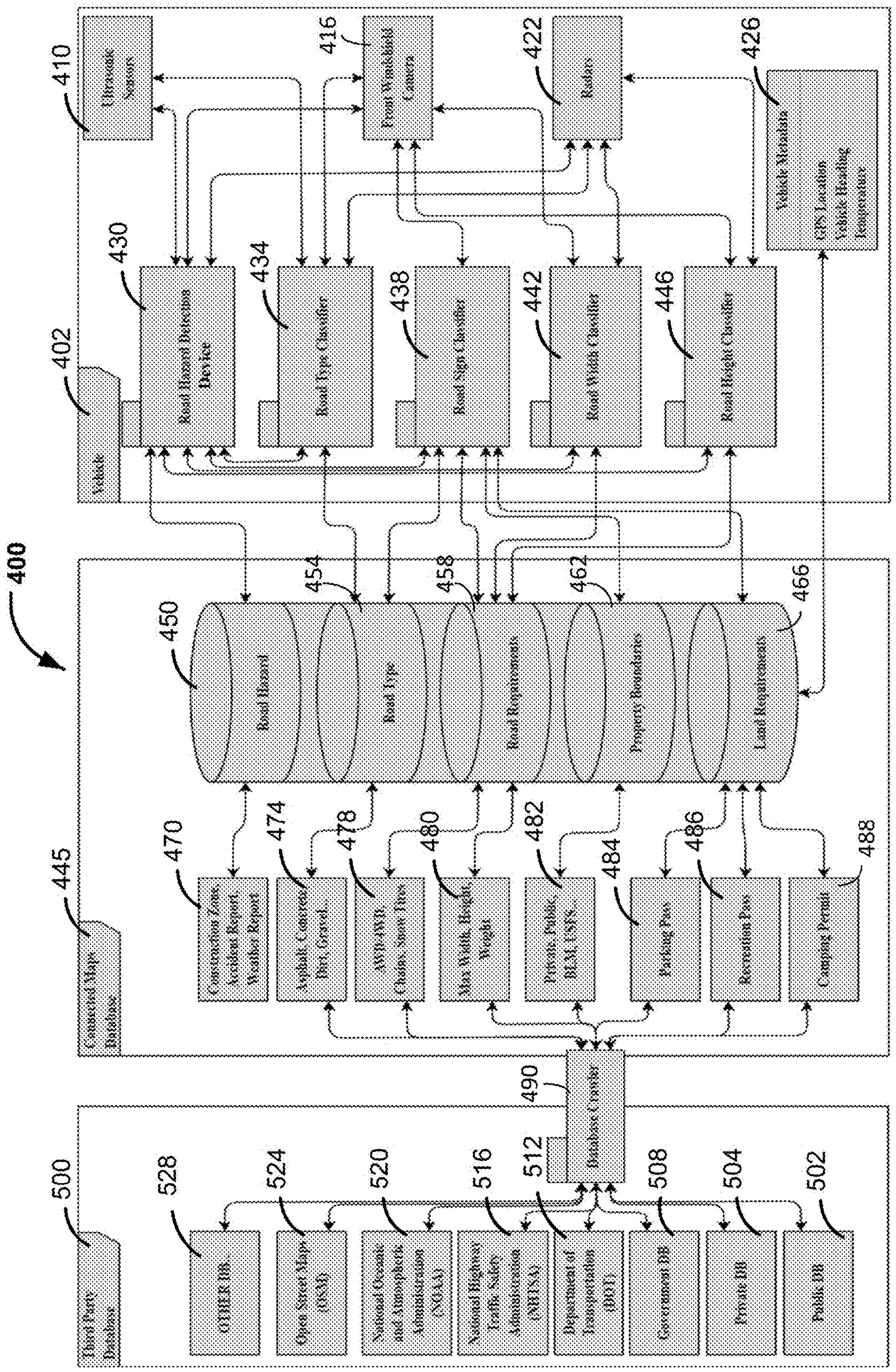
FIG. 5 shows a schematic diagram of another vehicle monitoring and advanced warning system.

FIG. 5 illustrates an example system 400 for controlling operation of a vehicle 402 based on driver attentiveness and sensed conditions. The system 400 shown in FIG. 5 includes ultrasonic sensors 410, a front windshield camera 416, radars 422, and vehicle metadata 426. The vehicle metadata includes GPS location data provided by a GPS arrangement, a vehicle heading provided by an inertial measurement device or other arrangement, and a temperature provided by a temperature sensor.

The system 400 on the vehicle 402 includes a road detection device 430, a road type classifier 434, a road sign classifier 438, a road width classifier 442, and a road height classifier 446. In one example, the road detection device 430 and the classifiers 434, 438, 442, 446 are algorithms or computer programs executed by an electronic processor, such as processor 114 of an exterior monitoring system 110 as shown in FIG. 1 executing a program stored in memory 116. In another arrangement, the road detection device 430 and the classifiers 434, 438, 442, 446 are executed by a plurality of dedicated electronic processors.

Wireless communication system 150 shown in FIG. 1 or an equivalent arrangement, provides communication between the vehicle 402 shown in FIG. 5 and a connected maps database 445. The connected maps database 445 includes road hazard database 450, road type database, 454, road requirements database 458, property boundary database 462, and land requirement database 466. The road hazard database 450 includes construction zone, accident report, and weather report information 470. The road type database 454 includes asphalt, concrete, dirt, and gravel information 474 for the road. The road requirements database includes data whether a user needs all-wheel drive/four-wheel drive, tire chains, and snow tires, as well as maximum width, maximum height, and maximum weight for a vehicle using the road.

A database crawler 490 communicating with the connected maps database 445 searches the internet or is configured to search public databases 502, private databases 504, government databases 508, Department of Transportation (DOT) database 512, National Highway Traffic Safety Administration (NHTSA) database 516, National Oceanic and Atmospheric Administration (NOAA) database 520, Open Street Maps (OSM) database 524, and other databases 528 to provide relevant information for the vehicle.

In operation, the example shown in FIG. 5 operates in a similar manner to the examples shown in FIGS. 1-4. More specifically, the road hazard detection device 430 shown in FIG. 5 operates in a similar manner to the arrangement discussed in FIG. 1 to determine road hazards. The road type classifier 434 operates to determine whether a road type is asphalt, concrete, dirt, gravel, or grass in one example. The road sign classifier 434 receives video images from the front windshield camera 416 to identify road signs and provide information to a vehicle operator. Appropriate information is provided by visual and/or audible methods to the vehicle operator.

In operation, the road width classifier 442 receives inputs from the front windshield camera 416 and the radars 422. The road width classifier determines a width of the road from the received data. The road width is compared to the vehicle width to provide an indication of a narrow or unpassable road.

In operation, the road height classifier 442 obtains inputs from the front windshield camera 416 and the radars 422 to determine road height based on a detected bridge, cables, power lines, tree branches or the like extending over and above a road. The determined height of obstacles is compared with the stored vehicle height. Appropriate warnings are provided using a visual display and sound system as discussed above.

The road requirements set forth above also include all wheel drive/four-wheel drive requirements, chain requirements, and snow tire requirements, depending upon whether there is snow or ice detected on a road or other weather conditions or weather reports.

Other data can be obtained from the third party database 500 shown in FIG. 5. In some instances, the connected maps database 445 is temporary and is updated based on path planning or changes in vehicle location. In some instances, other data structures or databases 528 to store and access data are used in place of or in addition to the named databases.

Accordingly, examples, aspects, and features herein provide, among other things, systems and methods for providing advanced warning of upcoming changes in road conditions and geographic data to a vehicle driver.

The invention claimed is:

1. A vehicle system for providing advanced warning of upcoming changes in road conditions and geographic data to a vehicle driver, the vehicle system comprising:
- a sensor;
- an output device; and
- an electronic processor, the electronic processor configured to:
  - determine a vehicle location;
  - send to a connected maps database, the vehicle location, a heading of the vehicle, and a request for information regarding a current road condition and an upcoming road condition, wherein the current road condition is the condition of the road at the location of the vehicle and the upcoming road condition is the condition of the road within a predetermined distance of the location of the vehicle in a direction of the vehicle heading;
  - receive information regarding the current road condition and the upcoming road condition from the connected maps database, wherein at least some of the information from the connected maps database is retrieved from a third party database by a database crawler;
  - receive sensor data from the sensor regarding the current road condition and the upcoming road condition;
  - execute a classifier to determine, based on the sensor data and the information received from the connected maps database, the current road condition and the upcoming road condition;
  - compare the upcoming road condition to the current road condition to determine whether an upcoming change in road condition exists; and
  - in response to determining the upcoming change in road condition exists, control the output device to alert a driver of a vehicle of the upcoming change in road condition and to control a change in vehicle operation in advance of the upcoming road condition.

2. The system of claim 1, wherein the electronic processor is configured to:
- transmit updates in road condition to a database.

3. The system of claim 1, wherein the electronic processor is configured to:
- determine whether an upcoming road hazard exists in the upcoming road condition.

4. The system of claim 3, wherein the electronic processor is configured to:
- in response to determining an upcoming road hazard exists in the upcoming road condition control the output device to display a human perceptible warning associated with the upcoming road hazard.

5. The system of claim 1, wherein the sensor further senses current geographic data and upcoming geographic data, and wherein the electronic processor is configured to:
- receive upcoming geographic data from the sensor, online databases, or a combination thereof, wherein the upcoming geographic data is associated with the predetermined distance ahead of the vehicle location.

6. The system of claim 5, wherein the electronic processor is configured to:
- compare the upcoming geographic data to the current geographic data.

7. The system of claim 6, wherein the electronic processor is configured to:

determine whether an upcoming geographic hazard exists in the upcoming road condition; and in response to determining an upcoming geographic hazard exists in the upcoming road condition, control the output device to display a warning associated with the upcoming geographic hazard.

8. The system of claim 1, wherein the electronic processor is configured to:

determine whether a road requirements is included in the upcoming road condition, wherein the road requirement is road width, tire chains, or snow tires, and in response to determining a road requirement is included in the upcoming road condition, control the output device to display a warning associated with the road requirement.

9. The system of claim 1, wherein the electronic processor is configured to:

search for third party databases associated with a predetermined location ahead of the vehicle location;

selectively query available third party databases for updates in upcoming road condition and upcoming geographic data at a predetermined location ahead of the vehicle location;

when updated data is received, update a local memory within a vehicle with the updated data; and transmit the updated data to the connected maps database.

10. A method of providing advanced warning of upcoming changes in road condition and geographic data to a vehicle driver, the method comprising:

determining a vehicle location;

sending to a connected maps database, the vehicle location, a heading of the vehicle, and a request for information regarding a current road condition and an upcoming road condition, wherein the current road condition is the condition of the road at the location of the vehicle and the upcoming road condition is the condition of the road within a predetermined distance of the location of the vehicle in a direction of the vehicle heading;

receiving information regarding the current road condition and the upcoming road condition from the connected maps database, wherein at least some of the information from the connected maps database is retrieved from a third party database by a database crawler;

receiving sensor data from a sensor regarding the current road condition and the upcoming road condition;

executing a classifier to determine, based on the sensor data and the information received from the connected maps database, the current road condition and the upcoming road condition;

comparing the upcoming road condition to the current road condition to determine whether an upcoming change road condition exists; and in response to determining the upcoming change in road condition exists, controlling an output device to alert a driver of a vehicle of the upcoming change in road condition and to control a change in vehicle operation in advance of the upcoming road condition.

11. The method of claim 10, further comprising:

determining whether an upcoming road hazard is included in the upcoming road condition.

12. The method of claim 11, further comprising:

in response to determining an upcoming road hazard is included in the upcoming road condition, controlling the output device to display a warning associated with the upcoming road hazard.

13. The method of claim 10, further comprising:

monitoring upcoming geographic data at a predetermined distance ahead of the vehicle location.

14. The method of claim 13, further comprising:

comparing upcoming geographic data to current geographic data.

15. The method of claim 14, further comprising:

determining whether an upcoming geographic hazard is included in the upcoming road condition, and in response to determining an upcoming geographic hazards is included in the upcoming road condition, controlling the output device to display a warning associated with the upcoming geographic hazard.

16. The method of claim 10, further comprising:

determining whether a road requirement is included in the upcoming road condition, wherein the road requirement is road width, tire chains, or snow tires, and in response to determining a road requirement is included in the upcoming road condition, controlling the output device to display a warning associated with the road requirement.

* * * * *